United States Patent
Aghili et al.

(10) Patent No.: US 8,224,363 B2
(45) Date of Patent: *Jul. 17, 2012

(54) METHOD AND APPARATUS FOR COMMUNICATING SHORT MESSAGE SERVICE AND SUPPLEMENTARY SERVICES MESSAGES

(75) Inventors: Behrouz Aghili, Commack, NY (US); Peter S. Wang, East Setauket, NY (US); Ulises Olvera-Hernandez, Kirkland, CA (US); Shankar Somasundaram, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,819

(22) Filed: Sep. 20, 2011

(65) Prior Publication Data

US 2012/0009932 A1    Jan. 12, 2012

Related U.S. Application Data

(63) Continuation of application No. 12/552,779, filed on Sep. 2, 2009, now Pat. No. 8,032,164.

(60) Provisional application No. 61/099,097, filed on Sep. 22, 2008.

(51) Int. Cl.
   *H04W 4/00*    (2009.01)
(52) U.S. Cl. ......... 455/466; 455/433; 370/352; 370/401
(58) Field of Classification Search .................. 455/466, 455/432.1, 433, 435.1; 370/352–356, 401
   See application file for complete search history.

(56) References Cited

U.S. PATENT DOCUMENTS

| 5,579,372 A | 11/1996 | Astrom |
| 5,878,397 A | 3/1999 | Stille et al. |
| 6,101,393 A | 8/2000 | Alperovich et al. |
| 6,577,723 B1 * | 6/2003 | Mooney .................. 379/221.08 |
| 7,003,307 B1 | 2/2006 | Kupsh et al. |
| 7,275,095 B1 | 9/2007 | Lebouill |

(Continued)

FOREIGN PATENT DOCUMENTS

WO    03/009616    1/2003

OTHER PUBLICATIONS

Third Generation Partnership Project, "Technical Specification Group Core Network and Terminals; Mobile radio interface Layer 3 specification; Core network protocols; State 3 (Release 8)," 3GPP TS 24.008 V8.2.0 (Jun. 2008).

(Continued)

*Primary Examiner* — Sharad Rampuria
(74) *Attorney, Agent, or Firm* — Volpe and Koenig, P.C.

(57) ABSTRACT

Methods and apparatus for enabling short message service (SMS) and supplementary services (SS) in a long term evolution (LTE) network via evolved packet system (EPS) mobility management (EMM) over the LTE control plane are described. In one embodiment, the radio resource control (RRC) connection signaling radio bearer (SRB) is used for SMS and SS transport over the LTE control plane between a wireless transmit/receive unit (WTRU) and a mobility management entity (MME). EMM interfaces and primitives are defined for actions towards SMS and SS entities for enabling SMS and SS services in LTE via the LTE control plane media. Message formats for SMS and SS message transport are also disclosed for sending SMS and SS messages within EMM uplink (UL) non-access stratum (NAS) transport and downlink (DL) NAS transport messages.

16 Claims, 7 Drawing Sheets

U.S. PATENT DOCUMENTS

| | | | |
|---|---|---|---|
| 7,333,822 B2* | 2/2008 | Laumen et al. | 455/466 |
| 7,386,009 B2 | 6/2008 | Reddy et al. | |
| 7,689,234 B2 | 3/2010 | Horvath et al. | |
| 7,801,539 B2 | 9/2010 | Murtagh et al. | |
| 7,822,437 B2* | 10/2010 | Barrow et al. | 455/552.1 |
| 8,032,164 B2* | 10/2011 | Aghili et al. | 455/466 |
| 2002/0077134 A1 | 6/2002 | Mizell et al. | |
| 2005/0154795 A1 | 7/2005 | Kuz et al. | |
| 2007/0184860 A1* | 8/2007 | Jansson | 455/466 |
| 2007/0254681 A1 | 11/2007 | Horvath et al. | |
| 2007/0287459 A1* | 12/2007 | Diachina et al. | 455/436 |
| 2008/0176586 A1* | 7/2008 | George et al. | 455/466 |
| 2008/0233947 A1 | 9/2008 | Herrero-Veron | |
| 2008/0233974 A1 | 9/2008 | Xu | |
| 2009/0111423 A1 | 4/2009 | Somasundaram et al. | |
| 2009/0270097 A1* | 10/2009 | Gallagher et al. | 455/435.1 |
| 2010/0087193 A1 | 4/2010 | Bishop et al. | |
| 2011/0189971 A1* | 8/2011 | Faccin et al. | 455/404.1 |

OTHER PUBLICATIONS

Third Generation Partnership Project, "Technical Specification Group Core Network and Terminals; Mobile radio interface Layer 3 specification; Core network protocols; State 3 (Release 8)," 3GPP TS 24.008 V8.6.0 (Jun. 2009).

Third Generation Partnership Project, "Technical Specification Group Core Network and Terminals; Mobile radio interface layer 3 supplementary services specification; Formats and coding (Release 8)," 3GPP TS 24.080 V8.0.0 (Dec. 2008).

Third Generation Partnership Project, "Technical Specification Group Core Network and Terminals; Mobile radio interface layer 3 supplementary services specification; Formats and coding (Release 7)," 3GPP TS 24.080 V7.4.0 (Sep. 2007).

Ericsson et al., "Summary of the email discussion [67#27] UMTS& LTE: Autonomous search," 3GPP TSG-RAN WG2#67bis, R2-095769 (Oct. 12-16, 2009).

Third Generation Partnership Project, "Technical Specification Group Core Network; Mobile radio interface signalling layer 3; General aspects (Release 6)," 3GPP TS 24.007 V6.5.0 (Sep. 2005).

Third Generation Partnership Project, "Technical Specification Group Core Network; Mobile radio interface signalling layer 3; General aspects (Release 5)," 3GPP TS 24.007 V5.4.0 (Mar. 2005).

Third Generation Partnership Project, "Technical Specification Group Core Network; Mobile radio interface signalling layer 3; General aspects (Release 4)," 3GPP TS 24.007 V4.4.0 (Jan. 2005).

Third Generation Partnership Project, "Technical Specification Group Core Network; Mobile radio interface signalling layer 3; General aspects (Release 1999)," 3GPP TS 24.007 V3.10.0 (Jun. 2004).

Third Generation Partnership Project, "Technical Specification Group Core Network; Mobile radio interface signalling layer 3 specification; Core Network Protocols; Stage 3 (Release 1999)," 3GPP TS 24.008 V3.20.0 (Dec. 2005).

Third Generation Partnership Project, "Technical Specification Group Core Network and Terminals; Mobile radio interface Layer 3 specification; Core network protocols; Stage 3 (Release 4)," 3GPP TS 24.008 V4.17.0 (Sep. 2007).

Third Generation Partnership Project, "Technical Specification Group Core Network and Terminals; Mobile radio interface Layer 3 specification; Core network protocols; Stage 3 (Release 5)," 3GPP TS 24.008 V5.16.0 (Jun. 2006).

Third Generation Partnership Project, "Technical Specification Group Core Network and Terminals; Mobile radio interface Layer 3 specification; Core network protocols; Stage 3 (Release 6)," 3GPP TS 24.008 V6.19.0 (Jun. 2008).

Third Generation Partnership Project, "Technical Specification Group Services and System Aspects; Circuit Switched Fallback in Evolved Packet System; Stage 2 (Release 8)," 3GPP TS 23.272 V8.4.0 (Jun. 2009).

Third Generation Partnership Project, "Technical Specification Group Services and System Aspects; Circuit Switched Fallback in Evolved Packet System; Stage 2 (Release 8)," 3GPP TS 23.272 V8.0.0 (Jun. 2008).

Third Generation Partnership Project, "Technical Specification Group Services and System Aspects; Circuit Switched Fallback in Evolved Packet System; Stage 2 (Release 9)," 3GPP TS 23.272 V9.0.0 (Jun. 2009).

Third Generation Partnership Project, "Technical Specification Group Core Network; Mobile radio interface layer 3 supplementary services specification; Formats and coding (Release 1999)," 3GPP TS 24.080 V3.7.1 (Sep. 2003).

Third Generation Partnership Project, "Technical Specification Group Core Network; Mobile radio interface layer 3 supplementary services specification; Formats and coding (Release 4)," 3GPP TS 24.080 V4.4.0 (Dec. 2004).

Third Generation Partnership Project, "Technical Specification Group Core Network; Mobile radio interface layer 3 supplementary services specification; Formats and coding (Release 5)," 3GPP TS 24.080 V5.5.0 (Dec. 2004).

Third Generation Partnership Project, "Technical Specification Group Core Network; Mobile radio interface layer 3 supplementary services specification; Formats and coding (Release 6)," 3GPP TS 24.080 V6.3.0 (Mar. 2005).

Third Generation Partnership Project, "Technical Specification Group Core Network and Terminals; Mobile radio interface Layer 3 specification; Core network protocols; Stage 3 (Release 7)," 3GPP TS 24.008 V7.12.0 (Jun. 2008).

Third Generation Partnership Project, "Technical Specification Group Core Network and Terminals; Mobile radio interface Layer 3 specification; Core network protocols; Stage 3 (Release 7)," 3GPP TS 24.008 V7.14.0 (Mar. 2009).

Third Generation Partnership Project, "Technical Specification Group Core Network and Terminals; Mobile radio interface signalling layer 3; General aspects (Release 8)," 3GPP TS 24.007 V8.2.0 (Jun. 2009).

Third Generation Partnership Project, "Technical Specification Group Core Network and Terminals; Mobile radio interface signalling layer 3; General aspects (Release 7)," 3GPP TS 24.007 V7.0.0 (Sep. 2005).

Third Generation Partnership Project, "Technical Specification Group Core Network and Terminals; Mobile radio interface Layer 3 specification; Core network protocols; Stage 3 (Release 8)," 3GPP TS 24.008 V8.2.0 (Jun. 2008).

Third Generation Partnership Project, "Technical Specification Group Core Network and Terminals; Mobile radio interface Layer 3 specification; Core network protocols; Stage 3 (Release 8)," 3GPP TS 24.008 V8.6.0 (Jun. 2009).

Third Generation Partnership Project, "Technical Specification Group Core Network and Terminals; Mobile radio interface layer 3 supplementary services specification;Formats and coding (Release 8)," 3GPP TS 24.080 V8.0.0 (Dec. 2008).

Third Generation Partnership Project, "Technical Specification Group Core Network and Terminals; Mobile radio interface layer 3 supplementary services specification;Formats and coding (Release 7)," 3GPP TS 24.080 V7.4.0 (Sep. 2007).

Third Generation Partnership Project, "Technical Specification Group Core Network and Terminals; Non-Access-Stratum (NAS) protocol for Evolved Packet System (EPS); Stage 3 (Release 8)," 3GPP TS 24.301 V0.4.0 (Jul. 2008).

Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.2.1 (Jun. 2009).

Third Generation Partnership Project, "Technical Specification Group Core Network and Terminals; Non-Access-Stratum (NAS) protocol for Evolved Packet System (EPS); Stage 3 (Release 8)," 3GPP TS 24.301 V1.0.0 (Sep. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.2.0 (Jun. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.6.0 (Jun. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.1.0 (Jun. 2009).

* cited by examiner

| CALL INDEPENDENT OPERATION NAME | CALL INDEPENDENT SS |
|---|---|
| REGISTER SS | + |
| ERASE SS | + |
| ACTIVATE SS | + |
| DEACTIVATE SS | + |
| INTERROGATE SS | + |
| REGISTER PASSWORD | + |
| GET PASSWORD | + |
| PROCESS UNSTRUCTURED SS-DATA | + |
| FORWARD CHECK SS-INDICATION | + |
| PROCESS UNSTRUCTURED SS-REQUEST | + |
| UNSTRUCTURED SS-REQUEST | + |
| UNSTRUCTURED SS-NOTIFY | + |

| INFORMATION ELEMENT | PRESENCE | FORMAT | LENGTH |
|---|---|---|---|
| PROTOCOL DISCRIMINATOR = EMM | M | V | 1/2 |
| SECURITY HEADER TYPE | M | V | 1/2 |
| MESSAGE TYPE = UPLINK OR DOWNLINK NAS TRANSPORT | M | V | 1 |
| NAS MESSAGE BODY (I.E., A FULL SMS OR SS MESSAGE) | | | |

| INFORMATION ELEMENT | PRESENCE | FORMAT | LENGTH |
|---|---|---|---|
| PROTOCOL DISCRIMINATOR | M | V | 1/2 OCTET |
| TRANSACTION IDENTIFIER | M | V | 1/2 OCTET |
| MESSAGE TYPE | M | V | 1 OCTET |

US 8,224,363 B2

METHOD AND APPARATUS FOR COMMUNICATING SHORT MESSAGE SERVICE AND SUPPLEMENTARY SERVICES MESSAGES

CROSS REFERENCE TO RELATED APPLICATIONS

This application is a continuation of U.S. patent application Ser. No. 12/552,779, filed Sep. 2, 2009, which issues as U.S. Pat. No. 8,032,164 on Oct. 4, 2011, which claims the benefit of U.S. Provisional Application No. 61/099,097 filed Sep. 22, 2008, the contents of which are hereby incorporated by reference herein.

TECHNICAL FIELD

This application is related to wireless communications.

BACKGROUND

Current efforts in the third generation partnership project (3GPP) long term evolution (LTE) program aim to bring new technology, new architecture, and new methods to provide improved spectral efficiency, reduced latency, and better utilization of radio resource to bring faster user experiences and richer applications and services with lower cost. Enabling the traditional commercially viable wireless services, especially the short message service (SMS), would greatly enhance the acceptance of the LTE technology in the wireless service product market.

In the current LTE specification, the SMS service is either not fully defined or it depends on the Internet protocol (IP) multimedia service (IMS) based SMS service or the circuit switched (CS) fallback methodology, such that the overhead of development cost is large, the network service interactions are complex and the transport efficiency is low. For supplementary services (SS) in LTE, the supportability has yet to be defined and enabled.

It would be desired to provide methods and apparatus that enable SMS and SS in LTE with implementation and backbone routing simplicity, while achieving overall data transport efficiency.

SUMMARY

Methods and apparatus for communicating SMS and SS messages in an LTE network via evolved packet system (EPS) mobility management (EMM) over the LTE control plane are described. A radio resource control (RRC) connection signaling radio bearer (SRB)-2 may be used for SMS and SS transport over the LTE control plane between a wireless transmit/receive unit (WTRU) and a mobility management entity (MME). EMM interfaces and primitives are defined for actions towards SMS and SS entities for enabling SMS and SS services in LTE via the LTE control plane media. Message formats for SMS and SS message transport are also disclosed for sending SMS and SS messages within EMM uplink (UL) non-access stratum (NAS) transport and downlink (DL) NAS transport messages.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "evolved Node-B (eNodeB)" includes but is not limited to a base station, a site controller, an access point (AP), or any other type of interfacing device capable of operating in a wireless environment.

Enabling SMS and SS over EMM

Figure 1:
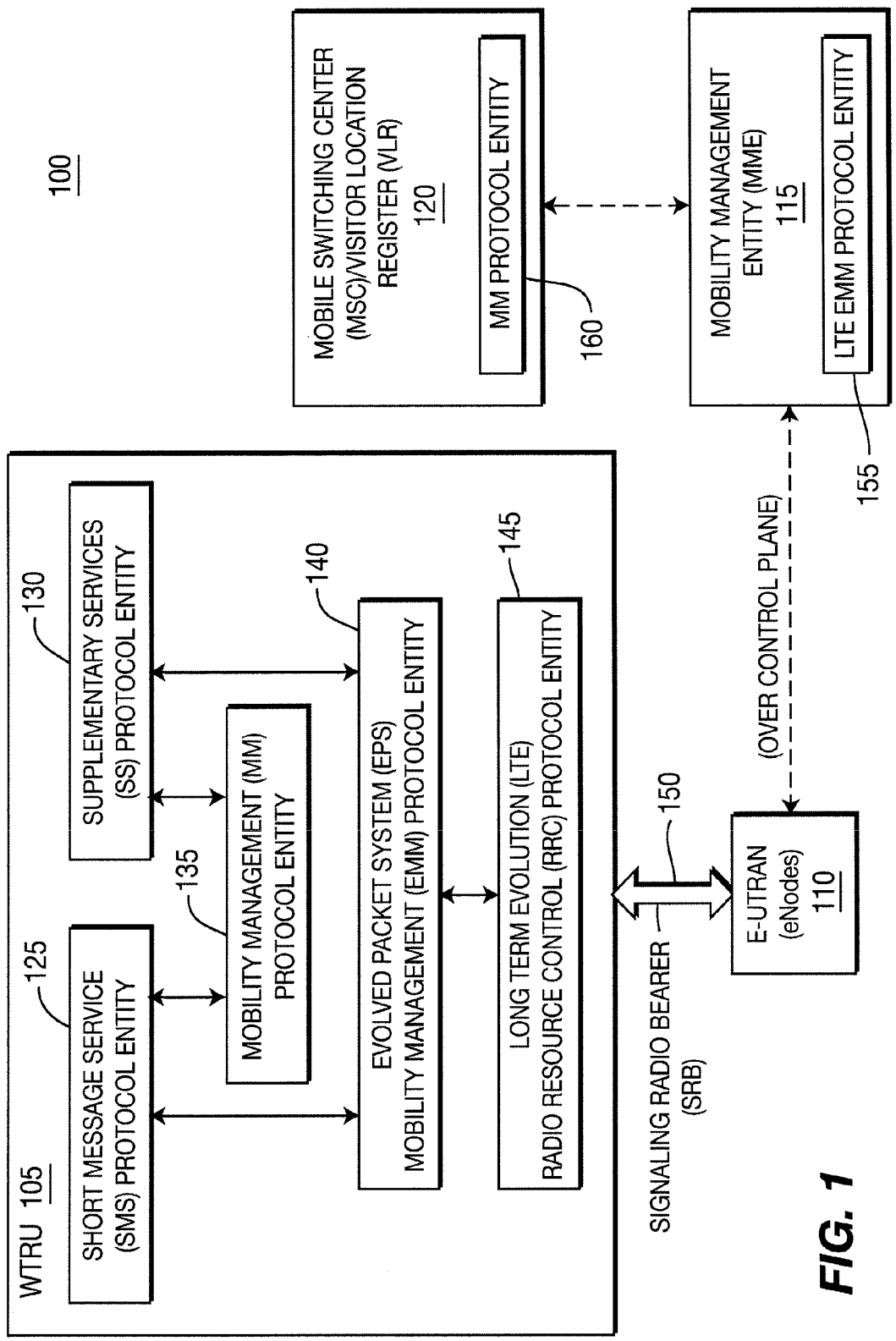
FIG. 1 shows a wireless communication system including a WTRU having a protocol entity architecture.

FIG. 1 shows a wireless LTE communication system 100 including a WTRU 105, an evolved universal terrestrial radio access network (E-UTRAN) 110, an MME 115 and a mobile switching center (MSC)/visitor location register (VLR) 120. The E-UTRAN includes a plurality of eNodeBs. The system 100 provides EMM functionality in the WTRU 105 and the MME 115, and supports SMS and SS by accessing an EMM interface over an LTE C-plane media. The MSC/VLR 120 may be part of a global system for mobile communications (GSM) network or universal mobile telecommunications system (UMTS) network, and is considered to be in the CS domain. The E-UTRAN 110 and the MME 115 are part of an LTE network, which is considered to be in a packet switch (PS) domain. SMS traffic may be transferred over the control plane of the LTE network using a CS fallback mechanism.

As shown in FIG. 1, the WTRU 105 includes an SMS protocol entity 125, an SS protocol entity 130, a mobility management (MM) protocol entity 135, an EMM protocol entity 140 and an LTE RRC protocol entity 145. The EPS EMM protocol entity 140 in the WTRU 105 will forward SMS and SS requests/messages towards the LTE network via the LTE RRC protocol entity 145 and SRB 150.

A corresponding functionality may exist on the LTE network side, (e.g., in a base station or a core network component). An LTE EMM protocol entity 155 in the MME 115 handles the forwarding and receiving of SMS and SS messages towards/from the traditional SMS or SS processing center, such as the MSC/VLR 120, via a serving gateway (SG) interface between the MME 115 and the MSC/VLR 120, and towards a service center (SC) (not shown) for SMS.

Logically, the SG interface is defined between the MME and VLR functional entities. The interface defined herein is between the existing connection management (CM) protocol entities (SMS and SS) and the new MM protocol entity, EMM, for LTE.

Figure 2:
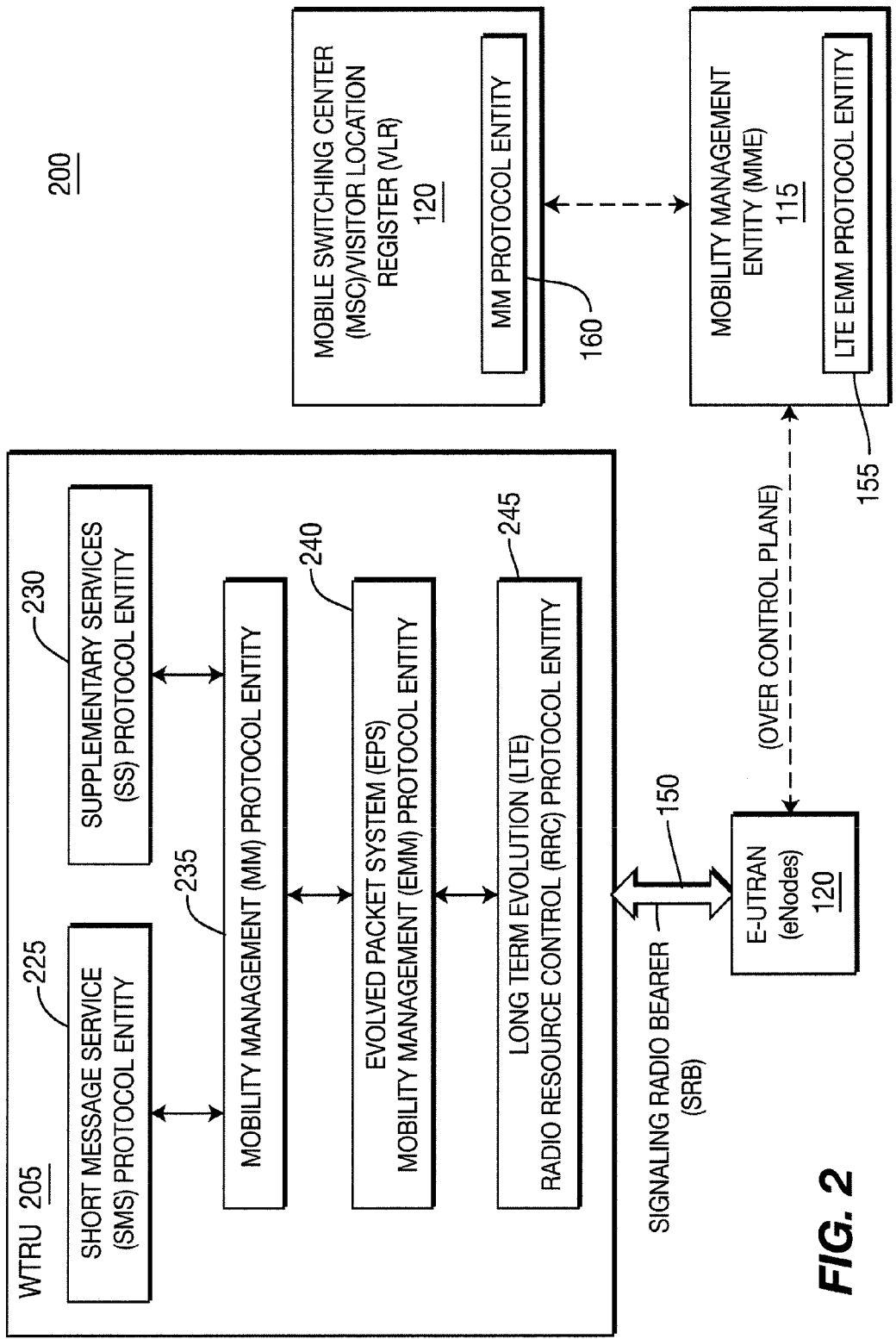
FIG. 2 shows a wireless communication system with a WTRU having an alternate protocol entity architecture.

FIG. 2 shows a wireless LTE communication system 200 including a WTRU 205 with an alternate protocol entity architecture. The WTRU 205 includes an SMS protocol entity 225, an SS protocol entity 230, an MM protocol entity 235, an EPS EMM protocol entity 240 and an LTE RRC protocol entity 245. However, unlike the protocol entity architecture of the WTRU 105 shown in FIG. 1, the SMS protocol entity 225 and the SS protocol entity 230 do not communicate directly with the EMM protocol entity 240, but instead only communicate with the MM protocol entity 235.

The protocol entity architecture of FIG. 2 also differs from that of FIG. 1 by the direct interface between the MM protocol entity 235 and the EMM protocol entity 240. This direct interface provides SMS and SS in LTE and legacy access networks. When an SMS/SS message is created, it will be sent to the MM protocol entity 235 in order to be delivered. Upon reception of the SMS/SS message, the MM protocol entity 235 checks for the existing radio access technology (RAT) of the terminating WTRU. If the existing RAT is either GSM/enhanced data rates for GSM evolution (EDGE) radio access network (GERAN) or UTRAN, the MM protocol entity 235 continues according to known procedures. However, in case the existing RAT is E-UTRAN/LTE, the MM protocol entity 235 contacts the EMM protocol entity 240 and delivers the higher layer information (the SMS/SS message). From this point forward, the defined procedures for EMM SMS/SS delivery are then followed.

The interface between the MM protocol entity 235 and the EMM protocol entity 240 may have a set of control primitives and data carriage containers (i.e., data primitives). The control primitives may be used for translating SMS and MM primitives sent to the EMM protocol entity 240 for session/connection establishment and error indication.

Enhanced EMM (E-EMM) Interface for SMS

The SMS protocol entities 125 and 225, (also referred to herein as an enhanced SMS (E-SMS) since the underlying RAT is LTE), communicate with a corresponding peer entity, (in the WTRU and the MME), using an EMM interface over an LTE control plane.

When an SMS message is to be sent and an EMM connection (through the LTE RRC connection) does not exist at the time, one must be established at the request of the E-SMS on the originating end.

The primitives and interactions used for SMS/EMM state manipulation between the E-SMS and the EMM include:
1) SMS-EMM-Conn-Est-Req (from E-SMS to EMM for requesting establishment of a connection for outgoing SMS if no connection currently exists);
2) SMS-EMM-Conn-Est-Cnf (from EMM to E-SMS to confirm the connection establishment request);
3) SMS-EMM-Conn-Est-Ind (from EMM to E-SMS for indicating incoming SMS message); and
4) SMS-EMM-Conn-Est-Rsp (from E-SMS to EMM for responding to the incoming SMS message indication).

Connection release primitives are also defined and include the following:
1) SMS-EMM-Rel-Req (from E-SMS to EMM for requesting release of established connection);
2) SMS-EMM-Rel-Cnf (from EMM to E-SMS for confirming the release request);
3) SMS-EMM-Rel-Ind (from EMM to E-SMS for indicating a connection release); and
4) SMS-EMM-Rel-Rsp (from E-SMS to EMM for responding to the connection release indication).

The data primitives between the E-SMS and EMM are also defined and include the following:
1) SMS-EMM-Data-Req (a primitive for carrying an SMS message from E-SMS to EMM); and
2) SMS-EMM-Data-Ind (a primitive for carrying an SMS message from EMM to E-SMS).

The following control protocol (CP) messages are used to transparently support the transportation of the SMS messages between the E-SMS and the EMM: CP-Data, CP-ACK and CP-Error messages.

Figure 3:
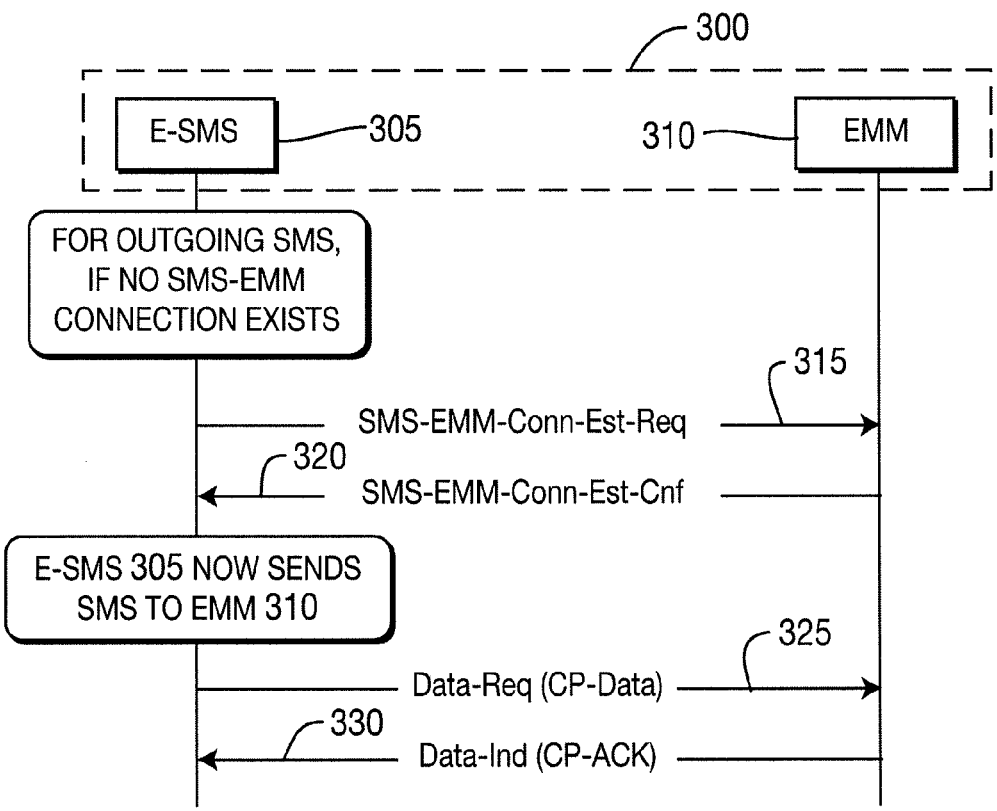
FIG. 3 shows a procedure for supporting an outgoing SMS.

FIG. 3 shows signaling that occurs between an E-SMS protocol entity 305 and an EMM protocol entity 310 in a wireless communication system 300. As shown in FIG. 3, when originating an SMS, the E-SMS 305 entity checks with the EMM 310 sending an SMS-EMM-Conn-Est-Req message 315 to the EMM protocol entity 310. The EMM protocol entity 310 in turn checks to see if it already has an EMM-connection over the LTE RRC connection. If that is the case, the EMM protocol entity 310 responds with an SMS-EMM-Conn-Est-Cnf message 320 back to the E-SMS protocol entity 305. If no EMM connection exists over the LTE RRC connection, the EMM protocol entity 310 triggers the LTE RRC to establish an RRC connection towards the currently attached E-UTRAN for "service request". When the RRC connection is successfully established, the EMM protocol entity 310 will then send an SMS-EMM-Conn-Est-Cnf message 320 back to the E-SMS 305. The outgoing SMS data activity may then proceed using Data-Req message 325 and Data-Ind message 330 to transport SMS messages.

Figure 4:
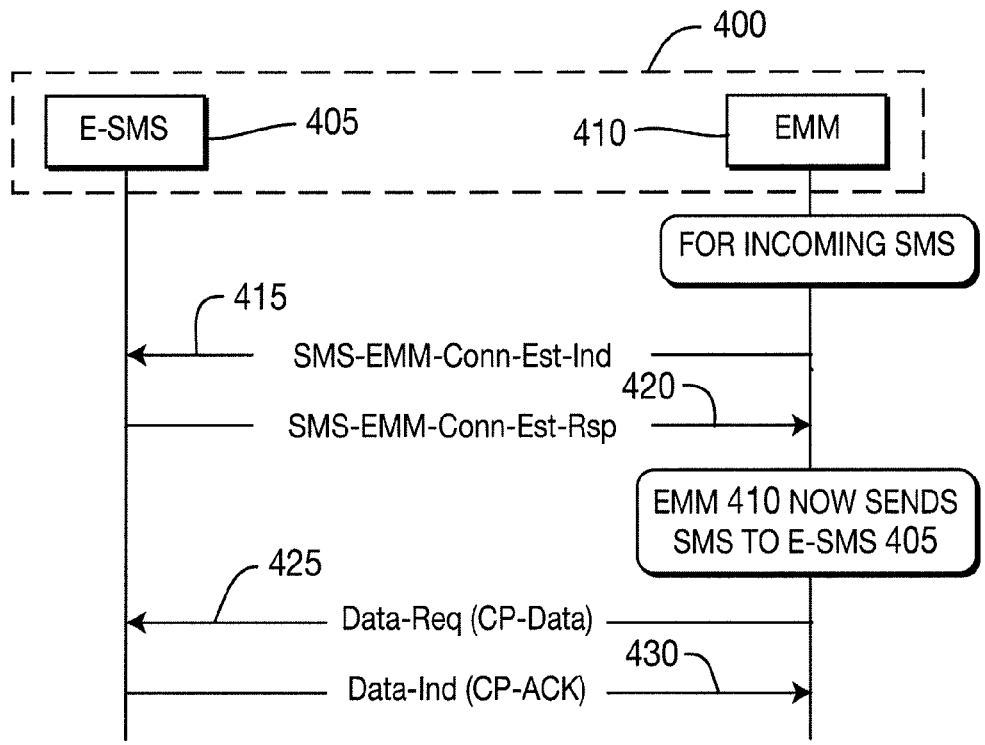
FIG. 4 shows a procedure for supporting an incoming SMS.

FIG. 4 shows signaling that occurs between an E-SMS protocol entity 405 and an EMM protocol entity 410 in a wireless communication system 400. As shown in FIG. 4, in the case of an incoming SMS, the EMM protocol entity 410 will be paged if no EMM/RRC connection towards the E-UTRAN exists. As the EMM protocol entity 410 responds to the page for establishing an RRC connection, the EMM protocol entity 410 will indicate the SMS event to the E-SMS protocol entity 405 via an SMS-EMM-Conn-Est-Ind message 415 and the E-SMS protocol entity 405 will respond with an SMS-EMM-Conn-Est-Rsp message 420. The incoming SMS data activity may then proceed using Data-Req message 425 and Data-Ind message 430 to transport SMS messages.

E-EMM Interface for SS

The SS protocol entities 130 and 230, (also referred to herein as an enhanced SS (E-SS) since the underlying RAT is LTE), communicate with a corresponding peer entity, (in the WTRU and the MME), using an EMM interface over an LTE control plane.

When an SS message is to be sent and an EMM session (through the LTE RRC connection) does not exist at the time, one must be established at the request of the E-SS on the originating end.

The primitives and interactions used for SS/EMM state manipulation between the E-SS and the EMM include:
1) SS-EMM-Sess-Est-Req (from E-SS to EMM for requesting establishment of a session for outgoing SS if no session currently exists);
2) SS-EMM-Sess-Est-Cnf (from EMM to E-SS to confirm of the session establishment request);
3) SS-EMM-Sess-Est-Ind (from EMM to E-SS for indicating an incoming SS message); and
4) SS-EMM-Sess-Est-Rsp (from E-SS to EMM for responding to the incoming SS message indication).

Session release primitives are also defined and include the following:
1) SS-EMM-Rel-Req (from E-SS to EMM for requesting release of established session);

2) SS-EMM-Rel-Cnf (from EMM to E-SS for confirming the release request);
3) SS-EMM-Rel-Ind (from EMM to E-SS for indicating a session release); and
4) SS-EMM-Rel-Rsp (from E-SS to EMM for responding to the session release indication).

The data primitives between the E-SS and the EMM are also defined and include the following:
1) SS-EMM-Data-Req (a primitive for carrying a SS message from E-SS to EMM); and
2) SS-EMM-Data-Ind (a primitive carrying a SS message from EMM to E-SS).

For SS in LTE, only the call independent SS messages will be supported for the LTE standard, since CS call service is not supported in release-8 LTE. Currently, the following call independent SS are supported and shown in FIG. 5.

Figures 7, 8, 9:
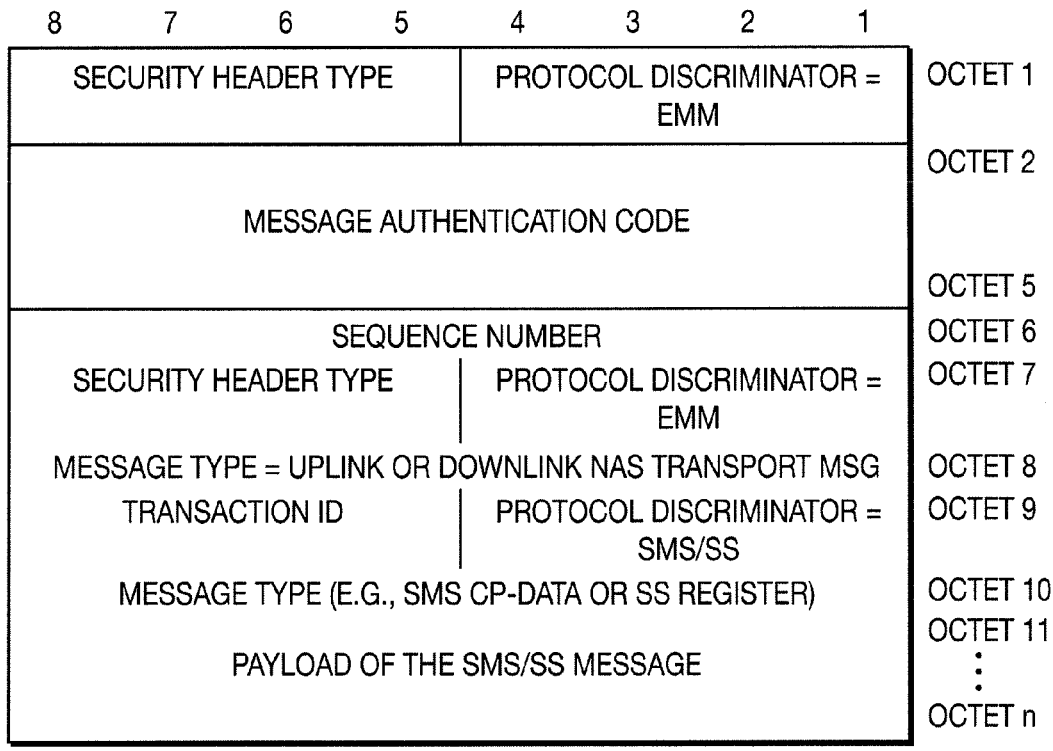
FIG. 7 shows an EMM message UL/DL transport format.
FIG. 8 shows an SMS and SS message header plus payload format.
FIG. 9 shows an EMM message format supporting SMS and SS in LTE.

Given that the SS message header construction is the same as those for SMS (see FIG. 8), the above supported call independent SS messages will be inserted at the octet-9 (with the SS message header) in the EMM message shown in FIG. 9.

Encapsulation Mechanism for SMS and SS transport with EMM

Base EMM Message Format for Encapsulation

Figures 5, 6:
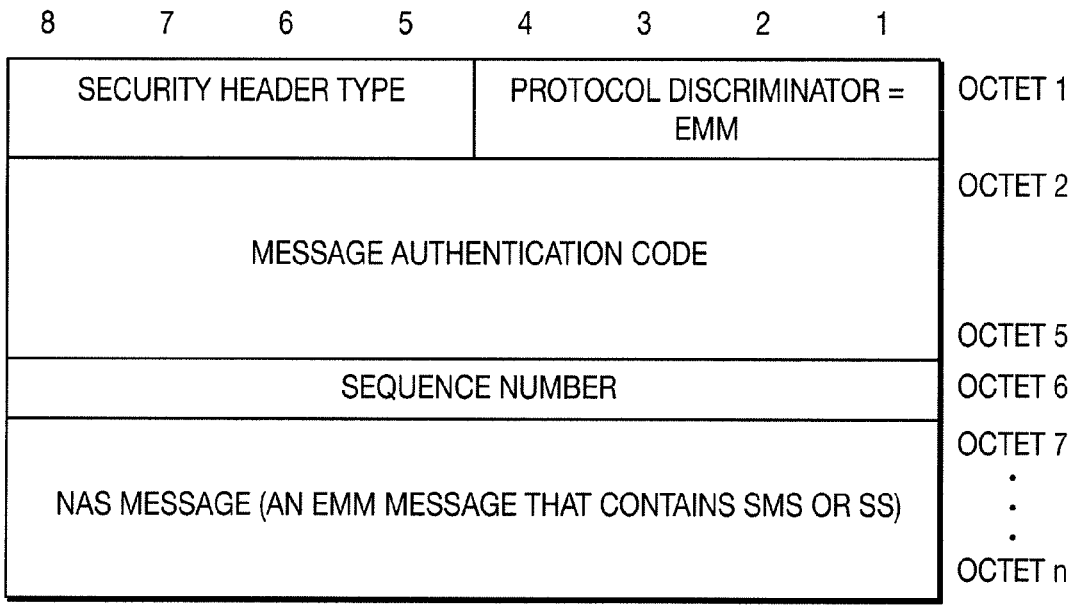
FIG. 5 shows call independent supplementary services supported using the systems of FIGS. 1 and 2.
FIG. 6 shows an overall NAS message header format for EMM.

The EMM message for transporting the SMS or SS is generated by including the SMS message or the SS message (shown in FIG. 8) in an information element (IE) of the EMM UL NAS transport message or DL NAS transport message (shown in FIG. 7), which is then encapsulated into the NAS message header of the EMM message shown in FIG. 6.

The NAS message shown in FIG. 7 is either a UL NAS transport message or a DL NAS transport message that carries the SMS or SS message for the intended service. Additional details of the header and body of the NAS transport message are shown in FIG. 9.

SMS and SS Message Header

The currently used CM level SMS messages, (CP-Data, CP-ACK and CP-Error), as well as the SS messages may have the header format shown in FIG. 8.

In FIG. 8, the transaction-identifier field may be used for SMS and SS as a field for their original transaction identifiers. The protocol discriminator field may be used to identify the encapsulated SMS or SS or others. The message type field may be used to indicate a type of each individual SMS or SS messages.

EMM Message Format for Encapsulating SMS and SS Messages

The combined header on EMM to support SMS or SS plus the message body, (i.e., the payload), is illustrated in FIG. 9. With this message format, the LTE access stratum control plane bearers are used to carry the SMS or the SS traffic between the WTRU and the network. In a first scenario, a direct interface between the SMS/SS entities and the EMM entity at the WTRU exist. Once the EMM session/connection is established with the E-UTRAN and MME via the LTE RRC connection, the WTRU may use the EMM and RRC interface through to the LTE SRB-2 as the SMS/SS transporting media. The SRB-2 (signal radio bearer 2) is mapped over the bidirectional logical channel DCCH (dedicated control channel), which is over the UL/DL transport channel UL-SCH (uplink shared channel)/DL-SCH (downlink shared channel), which is then mapped over the physical channel PUSCH (physical uplink shared channel)/PDSCH (physical downlink shared channel) in LTE. If an RRC connection does not exist in a mobile originated (MO) SMS scenario, the EMM protocol entity triggers the RRC protocol entity to establish an RRC connection.

In one scenario, the SMS protocol entity 125 in the WTRU 105 shown in FIG. 1 generates an SMS message using the header and payload shown in FIG. 8, and sends the SMS message to the EMM protocol entity 140. The EMM protocol entity 140 then formats a UL/DL NAS transport message using the header format shown in FIG. 7, whereby the SMS message is inserted in the NAS message body IE of the UL/DL NAS transport message. The UL/DL NAS transport message is then encapsulated in the NAS message field of the EMM message shown in FIG. 6, and is forwarded to the RRC protocol entity 145. The RRC protocol entity 145 then formats an UL/DL information transfer message to include the EMM message, and transmits the UL/DL information transfer message over the SRB 150.

In another scenario, the SS protocol entity 130 in the WTRU 105 shown in FIG. 1 generates an SS message using the header and payload shown in FIG. 8, and sends the SS message to the EMM protocol entity 140. The EMM protocol entity 140 then formats a UL/DL NAS transport message using the header format shown in FIG. 7, whereby the SS message is inserted in the NAS message body IE of the UL/DL NAS transport message. The UL/DL NAS transport message is then encapsulated in the NAS message field of the EMM message shown in FIG. 6, and is forwarded to the RRC protocol entity 145. The RRC protocol entity 145 then formats an UL/DL information transfer message to include the EMM message, and transmits the UL/DL information transfer message over the SRB 150.

Figure 10:
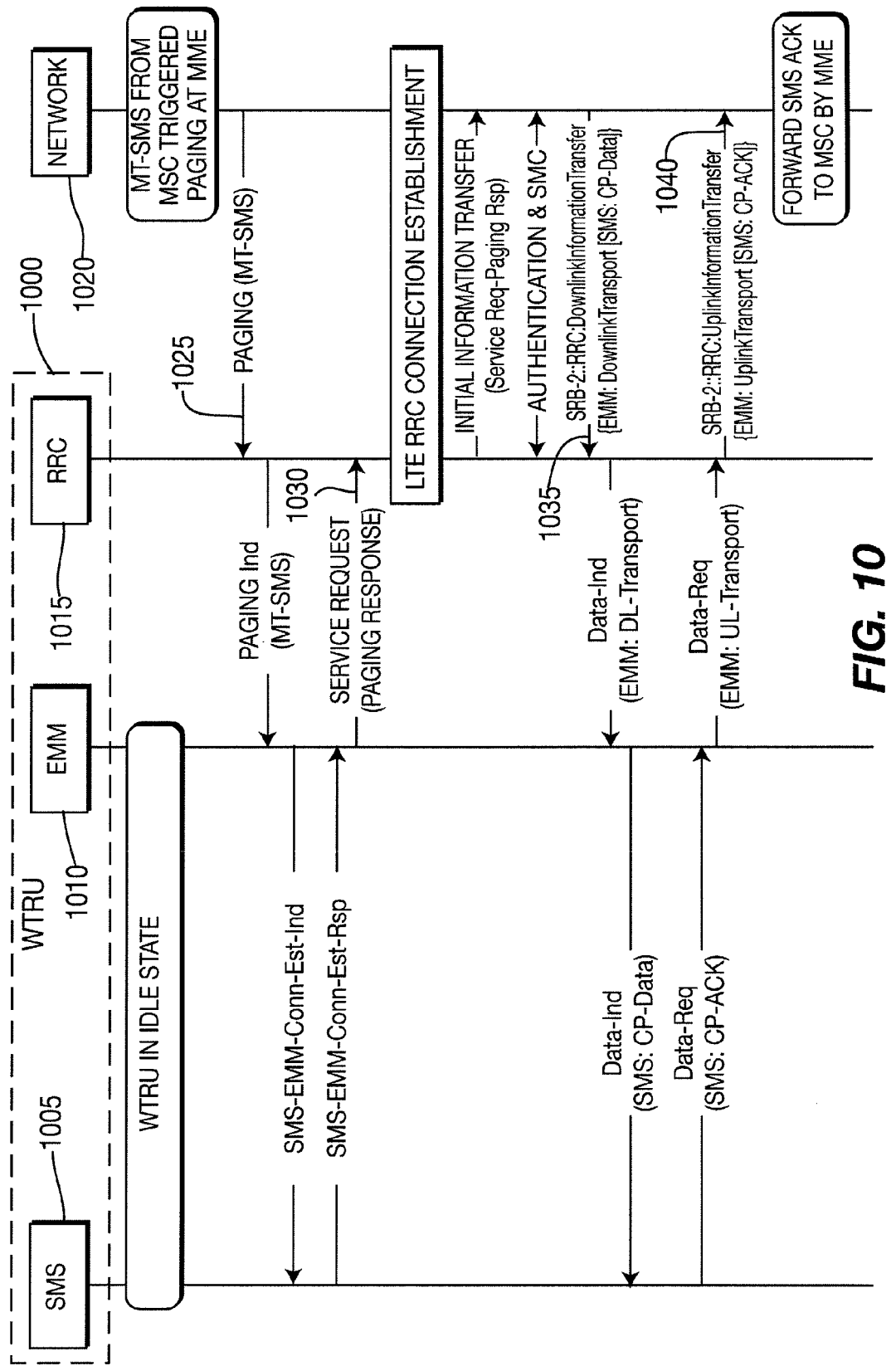
FIG. 10 is a signaling diagram for a mobile terminated (MT) SMS procedure.

FIG. 10 shows a signaling diagram for an MT SMS procedure using the primitives defined above. As shown in FIG. 10, a WTRU 1000 includes an SMS protocol entity 1005, an EMM protocol entity 1010 and an RRC protocol entity 1015. A network 1020 is illustrated as a single entity for simplicity.

In an MT SMS scenario, the network 1020 may send the WTRU 1000 a page 1025 while the WTRU 1000 is in an idle state, and the WTRU 1000 may respond with a service-request 1030 (with paging response) for establishing the RRC connection. The EMM protocol entity 1010 may then send and receive the SMS message using the EMM DL NAS transport message and UL NAS transport message. The RRC protocol entity 1015 uses an RRC DownlinkInformationTransfer message 1135 and an RRC UplinkInformationTransfer message 1140 for the transportation.

Figure 11:
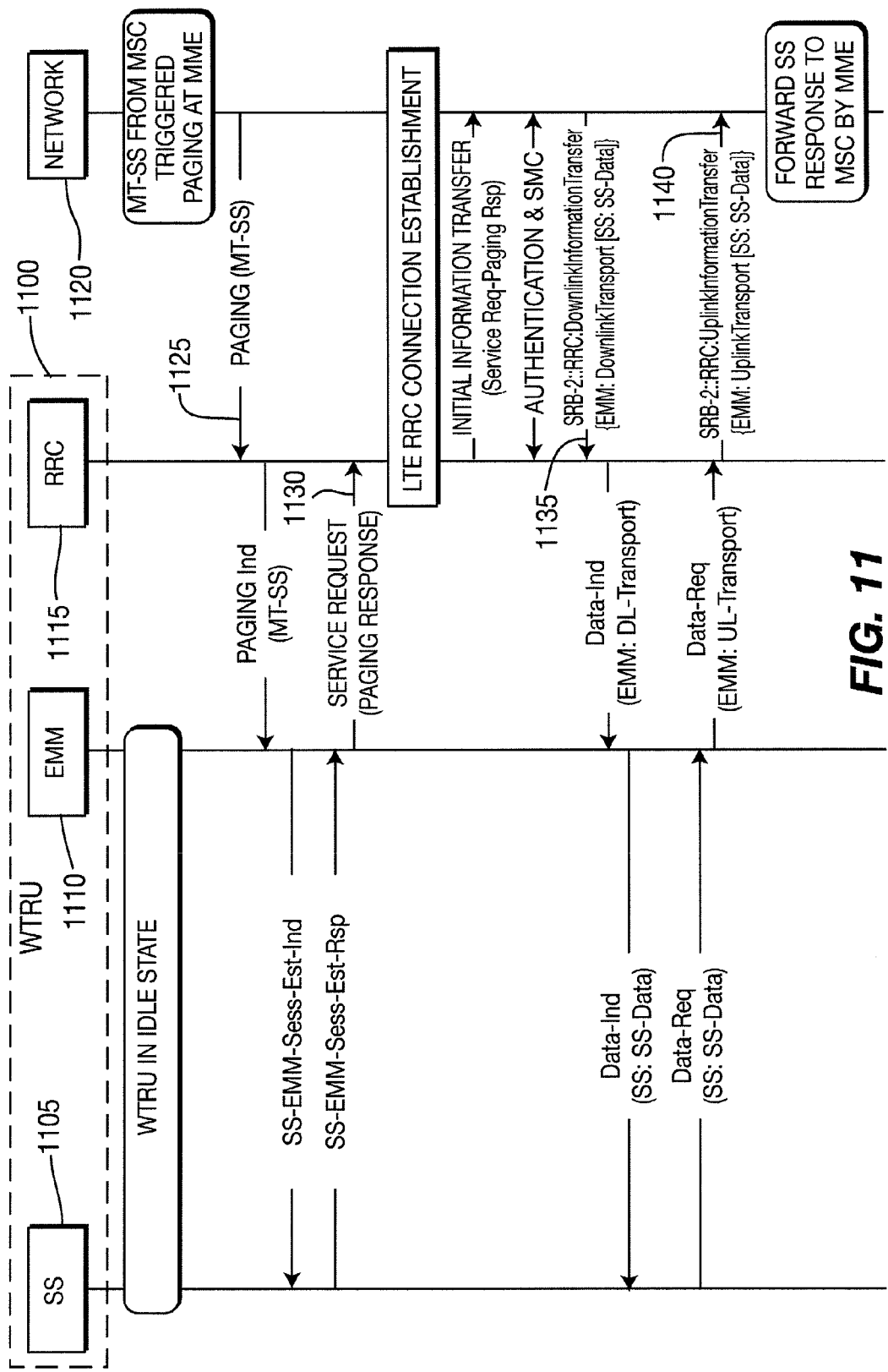
FIG. 11 is a signaling diagram for an MT SS procedure.

FIG. 11 shows a signaling diagram for an MT SS procedure using the primitives defined above. As shown in FIG. 11, a WTRU 1100 includes an SS protocol entity 1105, an EMM protocol entity 1110 and an RRC protocol entity 1115. A network 1120 is illustrated as a single entity for simplicity.

In an MT SMS scenario, the network 1120 may send the WTRU 1100 a page 1125 while the WTRU 1010 is in an idle state, and the WTRU 1100 may respond with a service request 1130 (with paging response) for establishing the RRC connection. The EMM protocol entity 1110 may then send and receive the SS message using the EMM DL NAS transport message in an RRC DownlinkInformationTransfer message 1135, or an EMM UL NAS transport message in the RRC UplinkInformationTransfer message 1140.

The features described above will be now summarized by referring to FIG. 1.

In one scenario, the WTRU 105 of FIG. 1 communicates SMS messages by using the SMS protocol entity 125 to request the EMM protocol entity 140 to send an SMS message. The EMM protocol entity 140 then initiates a procedure to send a UL NAS transport message including an IE containing the SMS message. The SMS protocol entity 125 may send the SMS message to the EMM protocol entity 140. The EMM protocol entity 140 formats the UL NAS transport message to include the SMS message, encapsulates the UL NAS transport message in an EMM message, and sends the EMM message to the LTE RRC protocol entity 145. The LTE RRC protocol entity 145 formats a UL information transfer message to include the EMM message, and transmits the UL information transfer message over an SRB. The UL information transfer message may be transmitted to the MME 115.

In another scenario, the WTRU 105 of FIG. 1 communicates SMS messages by using the EMM protocol entity 140 to receive a DL NAS transport message including an IE containing an SMS message. The EMM protocol entity 140 forwards the SMS message to the SMS protocol entity 125. The RRC protocol entity 145 may receive a DL information transfer message, remove the DL NAS transport message from the DL information transfer message, and forward the DL NAS transport message to the EMM protocol entity 140. The EMM protocol entity 140 then removes at least one NAS message header from the DL NAS transport message. The RRC protocol entity may receive the DL information transfer message from an MME.

In yet another scenario, the WTRU 105 of FIG. 1 communicates SS messages by using the SS protocol entity 130 to request the EMM protocol entity 140 to send an SS message. The EMM protocol entity 140 then initiates a procedure to send a UL NAS transport message including an IE containing the SS message. The SS protocol entity 130 may send the SS message to the EMM protocol entity 140. The EMM protocol entity 140 formats the UL NAS transport message to include the SS message, encapsulates the UL NAS transport message in an EMM message, and sends the EMM message to the LTE RRC protocol entity 145. The LTE RRC protocol entity 145 formats a UL information transfer message to include the EMM message, and transmits the UL information transfer message over an SRB. The UL information transfer message may be transmitted to the MME 115.

In yet another scenario, the WTRU 105 of FIG. 1 communicates SS messages by using the EMM protocol entity 140 to receive a DL NAS transport message including an IE containing an SS message. The EMM protocol entity 140 forwards the SS message to the SS protocol entity 130. The RRC protocol entity 145 may receive a DL information transfer message, remove the DL NAS transport message from the DL information transfer message, and forward the DL NAS transport message to the EMM protocol entity 140. The EMM protocol entity 140 then removes at least one NAS message header from the DL NAS transport message. The RRC protocol entity may receive the DL information transfer message from an MME.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
    a processor configured to produce a short message service (SMS) message;
    the processor configured to encapsulate the SMS message into a evolved packet system mobility management (EMM) uplink (UL) non-access stratum (NAS) transport message, wherein the EMM UL NAS transport message includes a protocol discriminator field and an NAS message container, and wherein the NAS message container includes the SMS message;
    the processor configured to produce a radio resource control (RRC) UL information transfer message including the EMM UL NAS transport message; and
    the processor configured to transmit the RRC UL information transfer message over a signaling radio bearer (SRB).

2. The WTRU of claim 1, wherein the SRB is SRB2.

3. The WTRU of claim 1, wherein the EMM UL NAS transport message further includes a security header type field.

4. The WTRU of claim 1, wherein the processor is further configured to transmit a service request using RRC to establish a connection with a mobility management entity to permit the RRC UL information transfer message to be transmitted.

5. The WTRU of claim 1, wherein the processor is further configured to implement a SMS entity and an EMM entity, wherein the SMS entity produces the SMS message and the EMM entity encapsulates the SMS message into the EMM UL NAS transport message.

6. The WTRU of claim 5, wherein the processor is further configured to implement a RRC entity and the RRC entity produces the RRC UL information transfer message.

7. A method, comprising:
    producing, by a wireless transmit/receive unit (WTRU), a short message service (SMS) message;
    encapsulating, by the WTRU, the SMS message into a evolved packet system mobility management (EMM) uplink (UL) non-access stratum (NAS) transport message, wherein the EMM UL NAS transport message includes a protocol discriminator field and an NAS message container and the NAS message container includes the SMS message;
    producing, by the WTRU, a radio resource control (RRC) UL information transfer message including the EMM UL NAS transport message; and
    transmitting, by the WTRU, the RRC UL information transfer message over a signaling radio bearer (SRB).

8. The method of claim 7, wherein the SRB is SRB2.

9. The method of claim 7, wherein the EMM UL NAS transport message further includes a security header type field.

10. The method of claim 7, further comprising:

transmitting, by the WTRU, a service request using RRC to establish a connection with a mobility management entity to permit the RRC UL information transfer message to be transmitted.

11. The method of claim 7, wherein the SMS message is produced by an SMS entity of the WTRU and the SMS message is encapsulated into the EMM UL NAS transport message by an EMM entity.

12. The method of claim 11, wherein the RRC UL information transfer message is produced by a RRC entity.

13. An evolved universal terrestrial radio access network (E-UTRAN) device, comprising:

a processor configured to receive a radio resource control (RRC) uplink (UL) information transfer message from a wireless transmit/receive unit (WTRU) over a signaling radio bearer (SRB), wherein the RRC UL information transfer message includes an evolved packet system mobility management (EMM) UL non-access stratum (NAS) transport message, and wherein the EMM UL NAS transport message encapsulates a short message service (SMS) message and includes a protocol discriminator field and an NAS message container, and wherein the NAS message container includes the SMS message; and the processor configured to provide the SMS message to a mobility management entity (MME).

14. The E-UTRAN device of claim 13, wherein the SRB is SRB-2.

15. The E-UTRAN device of claim 13, wherein the EMM UL NAS transport message further includes a security header type field.

16. The E-UTRAN device of claim 13, wherein the processor is further configured to receive an RRC message including a service request so that a connection is established between the WTRU and the MME to permit the RRC UL information transfer message to be received by the processor.

* * * * *